United States Patent
Hepkin et al.

(10) Patent No.: US 10,198,572 B2
(45) Date of Patent: Feb. 5, 2019

(54) VIRTUAL MACHINE MANAGER FACILITATED SELECTIVE CODE INTEGRITY ENFORCEMENT

(71) Applicant: Microsoft Technology Licensing, LLC, Redmond, WA (US)

(72) Inventors: David A. Hepkin, Redmond, WA (US); Kenneth D. Johnson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/179,378

(22) Filed: Feb. 12, 2014

(65) Prior Publication Data

US 2015/0082304 A1 Mar. 19, 2015

Related U.S. Application Data

(60) Provisional application No. 61/879,068, filed on Sep. 17, 2013.

(51) Int. Cl.
  *G06F 9/455* (2018.01)
  *G06F 21/53* (2013.01)
  *G06F 21/51* (2013.01)

(52) U.S. Cl.
  CPC .......... *G06F 21/53* (2013.01); *G06F 9/45533* (2013.01); *G06F 9/45558* (2013.01); *G06F 21/51* (2013.01)

(58) Field of Classification Search
  CPC .................................................... G06F 21/53
  See application file for complete search history.

(56) References Cited

U.S. PATENT DOCUMENTS 8,220,029 B2 7/2012 Zhang et al.
8,285,987 B1 10/2012 Kimball et al.
(Continued)

FOREIGN PATENT DOCUMENTS

CN 1702590 A 11/2005
CN 101853175 A 10/2010
(Continued)

OTHER PUBLICATIONS

"Driver Signing Policy (Windows Vista and Later)", Retrieved from: <http://msdn.microsoft.com/en-us/library/windows/hardware/ff548231(v=vs.85).aspx> on Sep. 23, 2013, Sep. 28, 2011, 2 pages.
(Continued)

*Primary Examiner* — Hang Pan

(57) ABSTRACT

A virtual machine manager facilitates selective code integrity enforcement. A virtual machine manager (or other higher privileged entity) can verify the integrity of code in memory pages, and a virtual processor running in kernel mode executes the code on a memory page only if the virtual machine manager (or other higher privileged entity) has verified the code integrity of that code. However, the virtual machine manager need not verify the integrity of code in memory pages when the virtual processor is running in user mode. Rather, an operating system running on the virtual processor can apply any of a variety of policies (e.g., optionally perform any of a variety of different checks or verifications of the code) to determine whether the code can be executed in user mode.

20 Claims, 5 Drawing Sheets

(56) References Cited

U.S. PATENT DOCUMENTS

| | | | | |
|---|---|---|---|---|
| 2006/0225036 | A1* | 10/2006 | Pandit | G06F 9/45508 717/115 |
| 2008/0235534 | A1* | 9/2008 | Schunter | G06F 12/145 714/6.13 |
| 2008/0244206 | A1* | 10/2008 | Heo et al. | 711/163 |
| 2008/0244572 | A1* | 10/2008 | Sahita et al. | 718/1 |
| 2010/0031360 | A1 | 2/2010 | Seshadri et al. | |
| 2012/0254995 | A1 | 10/2012 | Sallam | |
| 2012/0254999 | A1* | 10/2012 | Sallam | 726/23 |
| 2013/0055391 | A1 | 2/2013 | Sahita et al. | |

FOREIGN PATENT DOCUMENTS

| | | |
|---|---|---|
| CN | 101866408 A | 10/2010 |
| JP | 2009199530 A | 9/2009 |
| RU | 2390836 C2 | 5/2010 |
| RU | 2530691 C1 | 10/2014 |
| WO | 2009111405 A1 | 9/2009 |

OTHER PUBLICATIONS

"Intel 64 and IA-32 Architectures Software Developer's Manual", vol. 3 (3A, 3B, 3C): System Programming Guide, Jan. 2013, 1378 Pages.

Gadaleta, et al., "HyperForce: Hypervisor-enForced Execution of Security-Critical Code", In IFIP Advances in Information and Communication Technology, Jun. 4, 2012, pp. 1-12.

Litty, et al., "Hypervisor Support for Identifying Covertly Executing Binaries", In Proceedings of the 17th Conference on Security Symposium, Jul. 2008, 13 pages.

Seshadri, et al., "SecVisor: A Tiny Hypervisor to Provide Lifetime Kernel Code Integrity for Commodity OSes", In Proceedings of SOSP 2007, Oct. 2007, 17 pages.

Wang, et al., "HyperSafe: A Lightweight Approach to Provide Lifetime Hypervisor Control-Flow Integrity", In Proceedings of the IEEE Symposium on Security and Privacy, May 16, 2010, 16 pages.

"International Search Report and Written Opinion Issued in PCT Patent Application No. PCT/US2014/055290", dated Dec. 10, 2014, 12 Pages.

"International Preliminary Report on Patentability Issued in PCT Application No. PCT/US2014/055290", dated Dec. 14, 2015, 10 Pages.

"Second Written Opinion Issued in PCT Application No. PCT/US2014/055290", dated Oct. 1, 2015, 9 Pages.

"Office Action Issued in European Patent Application No. 14783695.1", dated Nov. 8, 2017, 6 Pages.

"First Office Action and Search Report Issued in Chinese Patent Application No. 201480049869.3", dated Jun. 4, 2018, 16 Pages.

"Office Action Issued in Mexican Patent Application No. MX/a/2016/003190", dated Jan. 29, 2018, 5 Pages.

"Notice of Allowance Issued in Japanese Patent Application No. 2016-543935", dated Aug. 3, 2018, 6 Pages.

* cited by examiner

200

Virtual Machine 106

---

Higher Privileged Entity 204

VIRTUAL MACHINE MANAGER FACILITATED SELECTIVE CODE INTEGRITY ENFORCEMENT

RELATED APPLICATIONS

This application claims priority to U.S. Provisional Application No. 61/879,068, filed Sep. 17, 2013, entitled "Hypervisor Enforced Code Integrity", to David A. Hepkin, et al., the entire disclosure of which is hereby incorporated by reference herein in its entirety.

BACKGROUND

As computing technology has advanced, computing devices have become increasingly interconnected. While this interconnection provides many benefits, it is not without its problems. One such problem is that computing devices are increasingly exposed to malicious programs. Malicious programs can operate in different ways, such as by stealing information from a computing device, disabling a computing device, using a computing device to launch attacks against other computing devices, and so forth. Although some techniques have been developed to protect a computing device against malicious programs, such malicious programs remain and can lead to frustrating user experiences when they infect a user's computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a memory page including executable code to be executed by a virtual processor of a virtual machine is identified, the virtual machine being managed by a virtual machine manager. A determination is made as to whether the memory page is to be executable in a kernel mode. In response to determining that the memory page is to be executable in kernel mode, a code integrity check of the executable code is performed and execution of the executable code is allowed for the kernel mode only if the code integrity check verifies the executable code. In response to determining that the memory page is not to be executable in kernel mode, an operating system of the virtual machine is allowed to determine whether to allow execution of the executable code.

In accordance with one or more aspects, a computing device includes an operating system, a virtual machine manager, and a processor. The processor is configured to allow the virtual machine manager to restrict kernel mode execution of memory pages to memory pages having code the integrity of which has been verified by a higher privileged entity that is more privileged than the operating system, but allow user mode execution of memory pages without regard for whether integrity of code on the memory pages has been verified by the higher privileged entity.

BRIEF DESCRIPTION OF THE DRAWINGS

The same numbers are used throughout the drawings to reference like features.

DETAILED DESCRIPTION

Virtual machine manager facilitated selective code integrity enforcement is discussed herein. A virtual machine is a software implementation of a physical device that can run programs analogous to a physical device. The virtual machine, and access to hardware of the physical device, is managed by a virtual machine manager on the physical device. The virtual machine and virtual machine manager access memory that is made up of multiple blocks or portions referred to as memory pages (or simply pages). Code integrity is used to facilitate protection against malicious code on the physical device. Code integrity refers to the integrity of code (e.g., a binary) being verified based on a code integrity policy. If the code is verified based on the code integrity policy, then the integrity of the code is verified and the code is allowed to execute; otherwise, the integrity of the code is not verified and the code is not allowed to execute.

A processor can execute code in a kernel mode or in a user mode. When a virtual processor of the virtual machine is running in kernel mode, the virtual processor runs only code the integrity of which is verified by the virtual machine manager (or by another entity more privileged than the operating system running on the virtual processor). The code integrity of memory pages including code is verified, and the virtual processor running in kernel mode can execute the code on a memory page only if the virtual machine manager (or other more privileged entity) has verified the code integrity of the code on the memory page. However, when the virtual processor is running in user mode, an operating system running on the virtual processor determines whether the code can be executed. The operating system can apply any of a variety of policies (e.g., perform any of a variety of different checks or verifications of the code) to determine whether the code can be executed in user mode, including optionally executing the code in user mode without performing any checks or verifications of the code.

Figure 1:
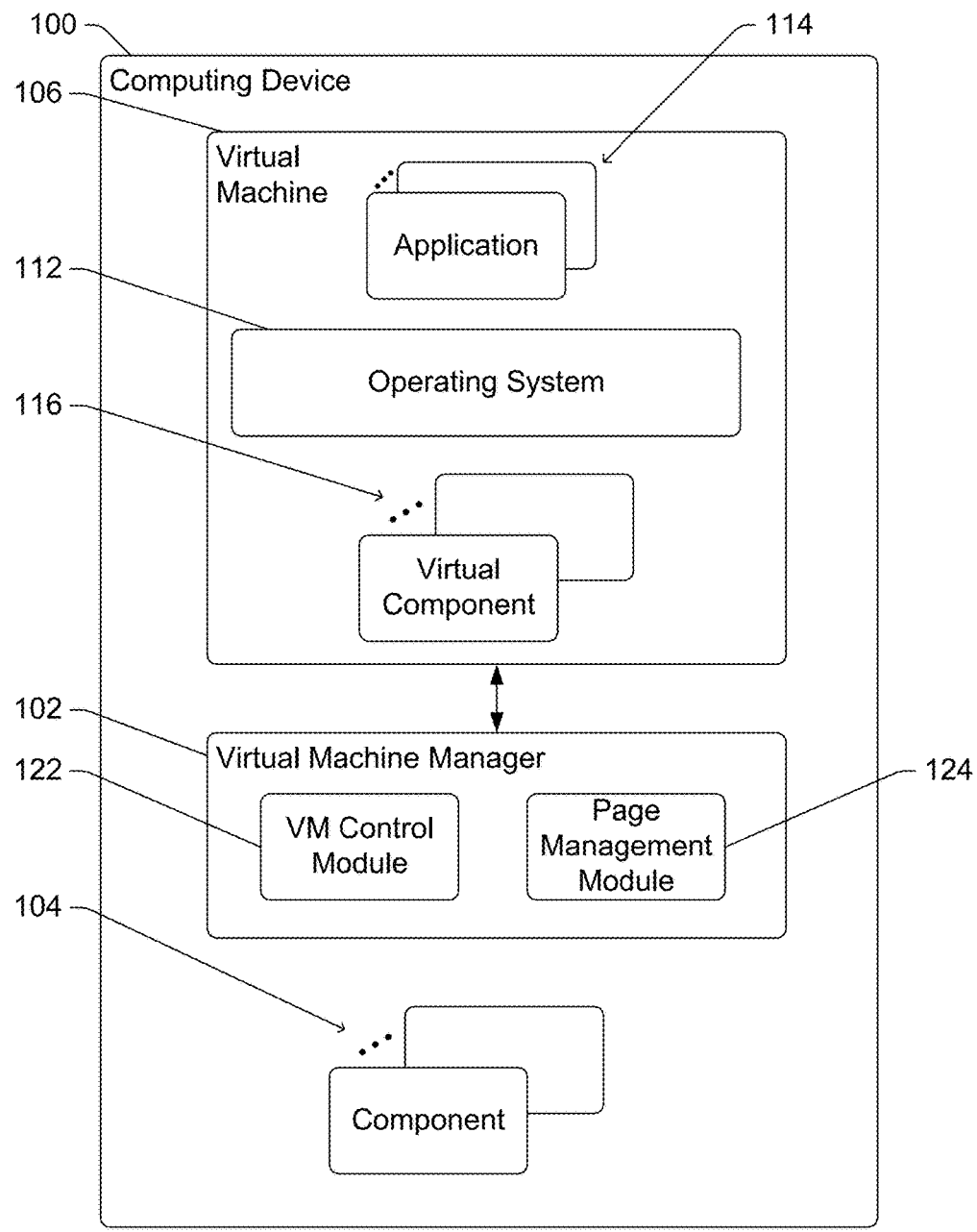
FIG. 1 is a block diagram illustrating an example computing device implementing the techniques discussed herein in accordance with one or more embodiments.

FIG. 1 is a block diagram illustrating an example computing device 100 implementing the techniques discussed herein in accordance with one or more embodiments. The computing device 100 can be any of a variety of different types of devices. For example, the computing device 100 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, a wearable computer, and so forth.

The computing device 100 includes a virtual machine manager 102, also referred to as a hypervisor, and one or more components 104. The virtual machine manager 102 manages access to the functionality provided by the components 104. Alternatively, the virtual machine manager 102 can run on a host operating system (not shown), in which case the host operating system manages access to the functionality provided by the components 104.

The components 104 can be a variety of different processor components, input/output (I/O) components, and/or other components or devices. For example, components 104 can include one or more processors or processor cores, one or more memory components (e.g., volatile and/or nonvolatile memory), one or more storage devices (e.g., optical and/or magnetic disks, Flash memory drives), one or more communication components (e.g., wired and/or wireless network adapters), combinations thereof, and so forth. Although illustrated as part of the computing device 100, one or more of the components 104 (e.g., one or more storage devices) can be implemented external to the computing device 100. Various components or modules running on the computing device 100, including the virtual machine manager 102, can access this functionality provided by the components 104 directly and/or indirectly via other components or modules.

The virtual machine manager 102 allows a virtual machine 106 to run on the computing device 100. A single virtual machine 106 is illustrated in the computing device 100, although alternatively multiple virtual machines can run on the computing device 100. A virtual machine refers to a software implementation of a physical computing device (or other machine or system) that can run programs analogous to a physical computing device. The virtual machine includes one or more virtual components that are similar to (but are software implementations of) the components 104. An operating system as well as other applications can execute using the virtual components as they would using the components 104, including running on virtual processors or virtual processor cores, accessing virtual memory, and so forth. The operating system and other applications executing in the virtual machine 106 need have no knowledge, and typically have no knowledge, that they are executing in a virtual machine.

Virtual machine 106 includes an operating system 112, one or more applications 114, and one or more virtual components 116. The operating system 112 runs or executes on one or more virtual processors or processor cores included as one or more of the components 116, and manages execution of the applications 114.

The virtual machine manager 102 includes a virtual machine (VM) control module 122 and a page management module 124. Virtual machine control module 122 manages the mapping of the virtual components 116 to the components 104, including scheduling of virtual processors or processor cores to execute on physical processors or processor cores. The page management module 124 identifies which pages are executable in kernel mode, and can optionally perform code integrity checks on code for memory pages to be executable in kernel mode as discussed in more detail below. Although illustrated as two separate modules, it should be noted that the functionality of the modules 122 and 124 can be combined into a single module (e.g., the functionality of the page management module 124 can be included in the VM control module 122).

The operating system 112 and virtual machine manager 102 manage storage of and access to memory that is made up of multiple blocks or portions that are referred to as memory pages (or simply pages). The memory can be, for example, any type of CPU (Central Processing Unit) addressable memory, such as volatile memory (e.g., RAM) or nonvolatile memory (e.g., Flash memory). Different programs can be allocated memory pages, and these programs can be applications 114, programs of operating system 112, or other components or modules.

The operating system 112 and virtual machine manager 102 can allow different types of access to memory pages by a program, such as read access, write access, and execute access. If read access (also referred to as read permission) is given to a memory page, then the content of the memory page is allowed to be read (e.g., to a particular one or more programs). If write access (also referred to as write permission) is given to a memory page, then content is allowed to be written to the memory page (e.g., by a particular one or more programs). If execute access (also referred to as execute permission) is given to a memory page, code stored in (also referred to as stored on) the memory page is allowed to be executed.

The operating system 112 and/or a more privileged entity than the operating system 112 (e.g., the virtual machine manager 102) can determine whether to give execute permission to a memory page based at least in part on verifying the code integrity of the code on the memory page. Verifying the code integrity refers to verifying the integrity of the code (e.g., a binary or portions thereof) based on a code integrity policy. Various different code integrity policies can be used, and the integrity of the code can thus be verified in various different manners. If the integrity of the code is verified based on the code integrity policy, then the code integrity is verified and the code is allowed to execute. However, if the integrity of the code is not verified based on the code integrity policy, then the code integrity is not verified and the code is not allowed to execute.

In one or more embodiments, the code integrity policy indicates that the integrity of code is verified based on the code having been signed using digital certificates that identify the origin of the code (e.g., an entity that digitally signed the code) and establish a chain of trust for the code. The code is signed by generating a digital signature based on the code and a cryptographic key. Without the cryptographic key (or a corresponding key, such as a private key of a public/private key pair) it is computationally very difficult to create a signature that can be verified using the cryptographic key. However, any entity with the cryptographic key (or a corresponding key, such as a public key of a public/private key pair) can use the key to verify the digital signature by executing a suitable digital signature verification algorithm on the key, the signature, and the code that was signed. As the digital signature is based on the code, any change to the code will result in the digital signature not being verified. Thus, the digital certificate allows an entity verifying the code to verify that the code has not been changed after the code was digitally signed.

The entity verifying the code (e.g., the operating system 112 or virtual machine manager 102) identifies one or more trusted entities. These trusted entities can be identified in different manners, such as being pre-configured in the verifying entity, being provided by an administrator of the computing device 100, or being obtained elsewhere. A chain of trust can be established that identifies the trusted entity as well as one or more other entities. The chain of trust refers to a series of entities beginning with the entity that digitally signed the code and ending with an entity that is trusted by the entity verifying the code. Any number of additional entities can be included in the chain, each entity verifying that it trusts the previous entity in the chain. For example, assume that code is signed by an entity A that is not trusted by the entity verifying the code, but that an entity D is trusted by the entity verifying the code. The chain of trust can include the entity A that digitally signed the code, an entity B providing a digital certificate verifying that entity B trusts entity A, an entity C providing a digital certificate verifying that entity C trusts entity B, and the entity D providing a digital certificate verifying that entity D trusts entity C.

If the chain of trust is verified and the code has not been modified, then the code integrity check succeeds—the integrity of the code is verified and the code is allowed to execute. However, if the chain of trust is not verified and/or the code has been modified, then the code integrity check fails—the integrity of the code is not verified and the code is not allowed to execute.

Alternatively, the integrity of the code can be verified in other manners. For example, code can be generated by, or at the direction of, the entity that is verifying the code. The code integrity policy can indicate that such code is automatically treated as verified by the entity, and the code integrity check for such code succeeds (the integrity of the code is verified and the code is allowed to execute). By way of another example, code can be verified by being analyzed according to various other rules or criteria indicated by the code integrity policy. If the analysis of the code determines that the code integrity policy has been satisfied, then the code is verified and the code integrity check succeeds (the integrity of the code is verified and the code is allowed to execute). However, if the analysis of the code determines that the code integrity policy has not been satisfied, then the code is not verified and the code integrity check fails (the integrity of the code is not verified and the code is not allowed to execute).

In one or more embodiments, the code of a program can be stored in multiple memory pages, and the code integrity check for those multiple pages is performed as a whole. The code integrity check for the code of the program is performed, and if the code integrity check succeeds then execute permission is given to all of the multiple memory pages in which the code is stored. However, if the code integrity check fails then execute permission is not given to any of the multiple memory pages in which the code is stored.

Alternatively, the code integrity check for each of the multiple pages in which code of a program is stored can be performed individually, and independently of the code integrity check for code stored in others of the multiple pages. For example, in response to an attempt to execute code in one of the multiple memory pages, the code integrity check is performed for at least the code on that memory page and execute permission is given or not given to that memory page based on whether the code integrity check fails or succeeds.

The one or more processors of the computing device 100 support execution of code in multiple different modes, referred to as kernel mode (also referred to as kernel-mode, supervisor mode, or supervisor-mode) and user mode (also referred to as user-mode). The applications 114 typically run in user mode, and the operating system 112 can include some core components that run in kernel mode and other components that run in user mode. User mode is less privileged (i.e., more restricted) than kernel mode. Drivers installed on or otherwise included in the operating system 112 to facilitate communication with virtual components 116 can run in user mode or in kernel mode. The use of kernel mode and user mode provides additional protection to code that runs in kernel mode, such as by a processor executing code preventing code running in user mode from accessing memory used by code running in kernel mode.

Although referred to herein as kernel mode and user mode, alternatively one or more additional modes may be supported by the processors of the computing device 100. In such situations, the modes discussed herein can be referred to as kernel mode and non-kernel mode, with the modes other than kernel mode being treated analogously to the user mode discussed herein. Alternatively, the modes discussed herein can be referred to as user mode and non-user mode, with the modes other than user mode being treated analogously to the kernel mode discussed herein.

Figure 2:
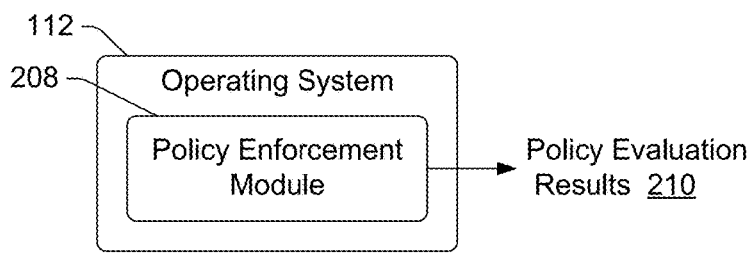
FIG. 2 illustrates an example system implementing the virtual machine manager facilitated selective code integrity enforcement techniques discussed herein in accordance with one or more embodiments.
Figure 2:
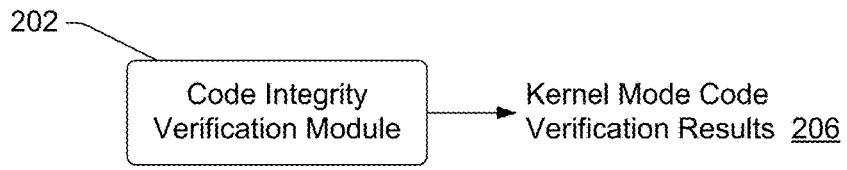

FIG. 2 illustrates an example system 200 implementing the virtual machine manager facilitated selective code integrity enforcement techniques discussed herein. The system 200 includes an operating system 112 running in a virtual machine 106, and a code integrity verification module 202 that is part of a higher privileged entity 204. The code integrity verification module 202 can optionally be included in a page management module 124 running in a virtual machine manager 102 of FIG. 1. The code integrity verification module 202 performs code integrity verification for code that a virtual processor desires to execute when the virtual processor is operating in kernel mode, providing kernel mode code verification results 206 indicating whether code integrity verification for the code succeeds or fails. If the code integrity verification succeeds then the code can be executed in kernel mode, and if the code integrity verification fails then the code cannot be executed in kernel mode.

The higher privileged entity 204 refers to an entity that is more privileged (less restricted) than the operating system 112. The higher privileged entity 204 can be the virtual machine manager 102 of FIG. 1. The higher privileged entity 204 can alternatively be one or more other entities, such as a virtual processor running in a secure mode that is a higher privilege than kernel mode of the operating system 112 (e.g., a secure mode managed by the virtual machine manager 102). The higher privileged entity can be implemented as software, firmware, and/or hardware. In situations in which the higher privileged entity 204 is an entity other than the virtual machine manager, the kernel mode code verification results 206 can be provided to the virtual machine manager, allowing the virtual machine manager to maintain a record identifying code the integrity of which has been verified and thus can be executed in kernel mode.

The operating system 112 includes a policy enforcement module 208 that implements one or more policies to determine whether code that a virtual processor desires to execute when the virtual processor is operating in user mode can be executed. Various different policies can be implemented by the policy enforcement module 208, such as performing code integrity verification analogous to the code integrity verification module 202, checking other characteristics of the code or the operating system 112, and so forth. The policy implemented by the policy enforcement module 208 can also be to execute all code in user mode (e.g., execute code in user mode without performing any code integrity checks or other verifications). The policy enforcement module 208 applies the policy for code when the virtual processor is operating in user mode, providing policy evaluation results 210 indicating whether the policy is satisfied (the policy check succeeds) or is not satisfied (the policy check fails). If the policy check succeeds then the code can be executed in user mode, and if the policy check fails then the code cannot be executed in user mode.

Thus, the more privileged entity 204 performs code integrity verification (enforces code integrity) for pages in kernel mode, whereas the operating system 112 in a virtual machine 106 performs policy checks (enforces policy) for pages in user mode. In one or more embodiments, the policy enforcement module 208 is implemented in kernel mode code of the operating system 112. Thus, policy checks for code running in user mode are made by code running in kernel mode, with the code integrity of the code running in kernel mode having been verified by the virtual machine manager 102 or other more privileged entity.

Thus, the virtual machine manager 102 is able to restrict execution of code in kernel mode to code that has been verified by the higher privileged entity 204, but execution of code in user mode is controlled separately by the operating system 112 running on the virtual machine 106. The operating system 112 performs any code verification and/or other policy checks based on the configuration of the policy enforcement module 208, and independently of the code integrity verification performed by the higher privileged entity 204.

The techniques discussed herein thus provide an additional level of security due to the virtual machine manager preventing compromised code of the operating system 112 from executing in kernel mode. At the same time, however, the techniques discussed herein allow the code integrity of code executing in user mode to be verified and/or other policies implemented by the operating system 112 as appropriate. The operating system 112 sets the policies for code executing in user mode, allowing the operating system 112 to support situations where no code verification is performed. For example, the operating system 112 may desire to allow some code to execute in user mode without being verified, or allow dynamic code generation to be performed for some code executing in user mode. Such determinations can be made by the operating system 112, all while the user of the computing device 100 is assured that the operating system 112 has not been compromised because the code integrity of the operating system 112 was verified by the virtual machine manager 102 (or other higher privileged entity).

Figure 3:
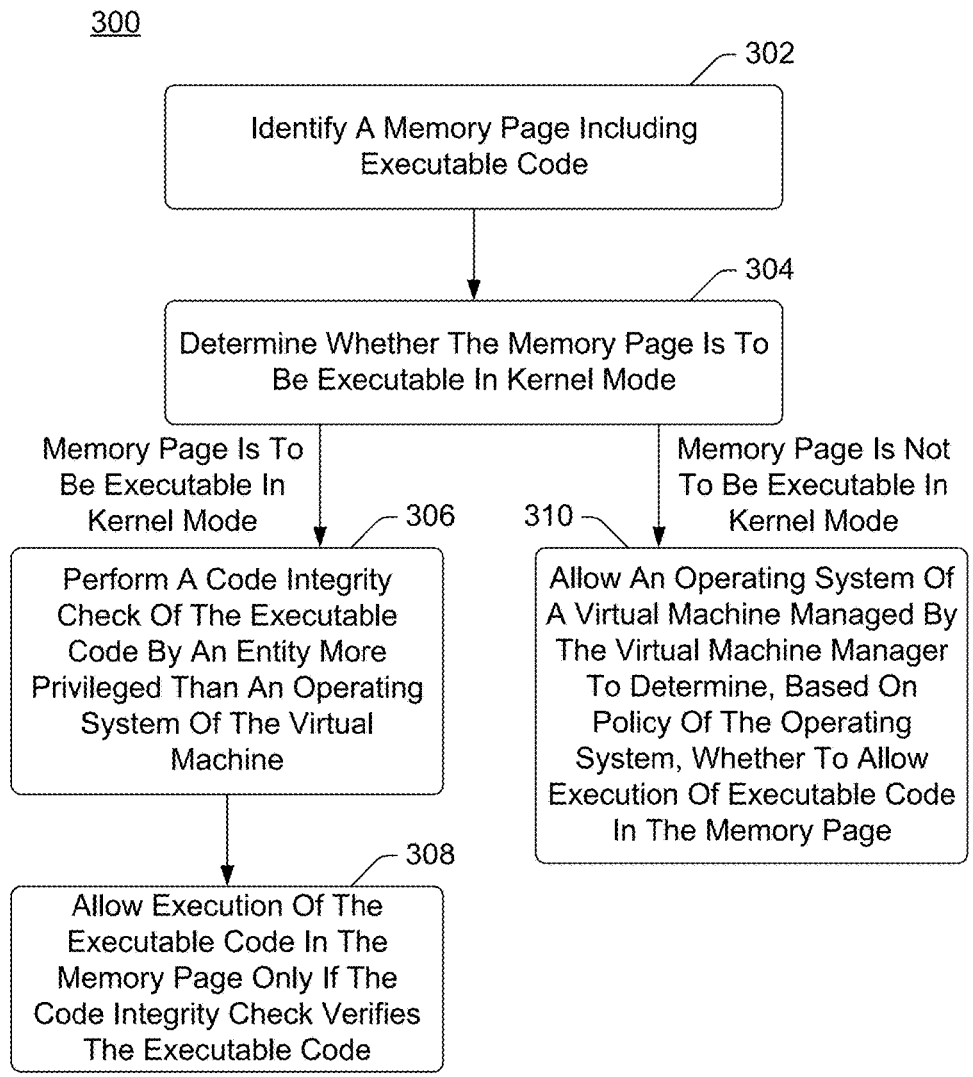
FIG. 3 is a flowchart illustrating an example process for implementing virtual machine manager facilitated selective code integrity enforcement in accordance with one or more embodiments.

FIG. 3 is a flowchart illustrating an example process 300 for implementing virtual machine manager facilitated selective code integrity enforcement in accordance with one or more embodiments. Process 300 is carried out at least in part by a virtual machine manager, such as virtual machine manager 102 of FIGS. 1 and 2, and can be implemented in software, firmware, hardware, or combinations thereof. Process 300 is shown as a set of acts and is not limited to the order shown for performing the operations of the various acts. Process 300 is an example process for implementing virtual machine manager facilitated selective code integrity enforcement; additional discussions of implementing virtual machine manager facilitated selective code integrity enforcement are included herein with reference to different figures.

In process 300, a memory page including executable code to be executed by a virtual processor is identified (act 302). The memory page can be identified at different times and in response to different events, such as a request by a virtual machine or operating system managed by a virtual machine to make a memory page executable, a request by a virtual machine or operating system managed by a virtual machine to allow a program to be executed by the virtual processor, and so forth.

A determination is made as to whether the memory page is to be executable in a kernel mode (act 304). This determination can be made in various manners, such as being identified by the virtual machine or operating system when making the request to make the memory page executable.

Responsive to determining that the memory page is to be executable in a kernel mode, a code integrity check of the executable code is made by a higher privileged entity (act 306). The higher privileged entity is an entity more privileged than an operating system managed by the virtual machine as discussed above. The more privileged entity can be the virtual machine manager, or other entity as discussed above. The code integrity check is made by verifying the integrity of the code based on a code integrity policy in various manners as discussed above, for example by verifying the code based on a chain of trust being verified and the digital signature verifying that the code has not been modified. Execution of the executable code in the memory page is allowed only if the code integrity check verifies the executable code (act 308). Execution of the executable code in the memory page can be allowed by, for example, the virtual machine manager giving execution permission to the memory page identified in act 302.

Returning to act 304, responsive to determining that the memory page is not to be executable in a kernel mode, an operating system of a virtual machine managed by the virtual machine manager is allowed to determine whether to allow execution of the executable code based on policy of the operating system (act 310). The operating system can implement various different policies to determine whether to execute the code, including a code integrity check, as discussed above.

A request to make a memory page executable in act 302 can be directed to the virtual machine manager, or alternatively to the higher privileged entity (e.g., the higher privileged entity 204 of FIG. 2). In one or more embodiments, if the virtual machine manager is the higher privileged entity, then the request is directed to the virtual machine manager, and the virtual machine manager performs the code integrity check in act 306. However, if another entity is the higher privileged entity, then the request is directed to the higher privileged entity (e.g., directly or via the virtual machine manager), the higher privileged entity performs the code integrity check in act 306, and if the code integrity check in act 306 verifies the executable code then the higher privileged entity notifies the virtual machine manager to make the memory page executable in kernel mode. The virtual machine manager can make the memory page executable in kernel mode by, for example, updating a second level address translation table as discussed in more detail below.

Thus, the virtual machine manager facilitates selective code integrity enforcement. Code integrity of kernel mode code is enforced by the virtual machine manager (or other higher privileged entity that leverages the virtual machine manager), whereas enforcement of code integrity of user mode code is left to the operating system running in the virtual machine managed by the virtual machine manager.

Returning to FIG. 1, in one or more embodiments the computing device 100 employs virtual memory. Virtual memory refers to an address space that is mapped to another address space (e.g., physical memory). An application is assigned a virtual memory space in which the application code is executed and data is stored. A memory manager (e.g., of a processor) manages mapping the virtual memory addresses in the virtual memory space to addresses in the other memory space. When mapping virtual memory addresses from the virtual memory address space to another memory space, an address translation is performed. An address translation table is used to perform this mapping, and can be leveraged to implement the techniques discussed herein.

In one or more embodiments, an address translation table is implemented in hardware, such as by a physical processor that is a component 104 of the computing device 100. The address translation table allows the virtual machine manager 102 to selectively enforce code integrity as discussed in more detail below. Alternatively, hardware of the computing device 100 (e.g., a physical processor that is a component 104) can use various other tables, lists, records, structures, and so forth to allow the virtual machine manager 102 to selectively enforce code integrity. Alternatively, various other tables, lists, records, structures, and so forth implemented in software (e.g., as part of virtual machine manager 102 or as part of another component or module of the computing device 100) can be used to allow the virtual machine manager 102 to selectively enforce code integrity.

Figure 4:
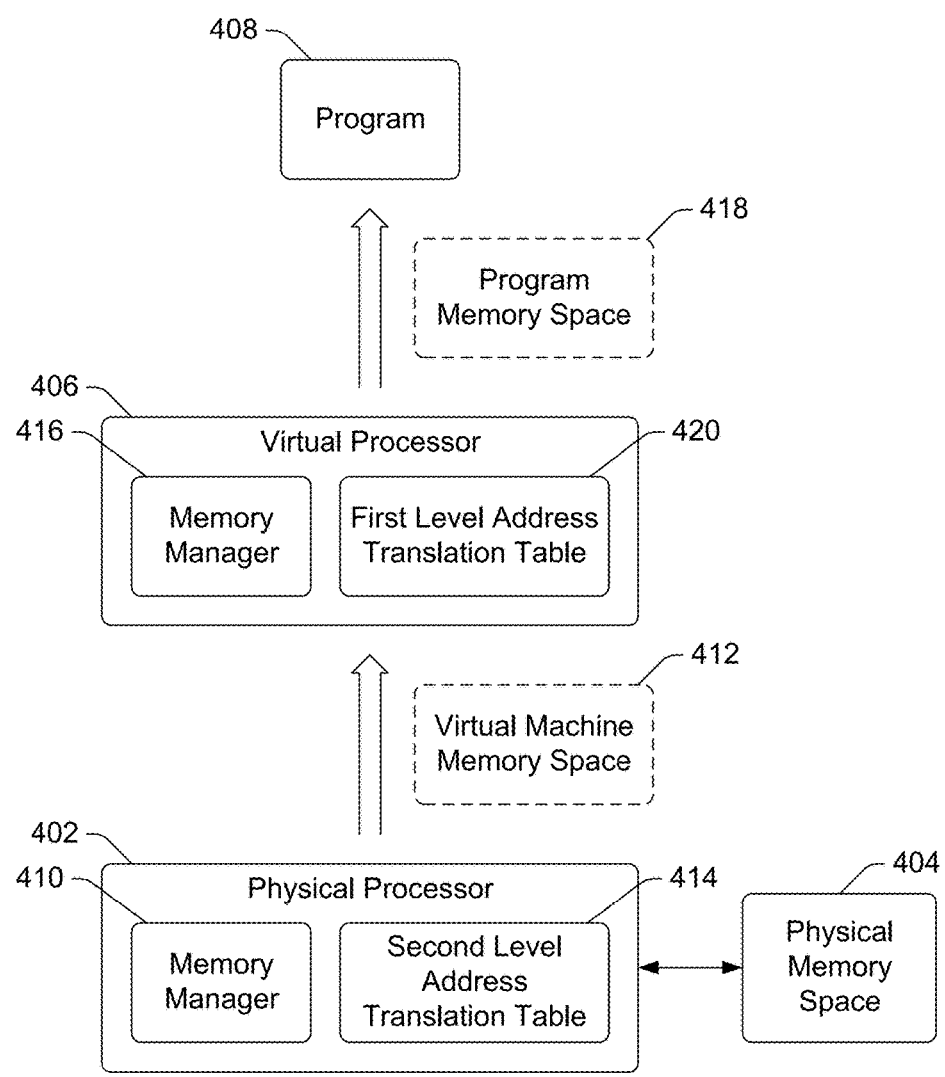
FIG. 4 illustrates another example system implementing the virtual machine manager facilitated selective code integrity enforcement in accordance with one or more embodiments.

FIG. 4 illustrates an example system 400 implementing the virtual machine manager facilitated selective code integrity enforcement in accordance with one or more embodiments. The system 400 can be, for example, computing device 100 of FIG. 1. The system 400 includes a physical processor 402, a physical memory space 404, a virtual processor 406, and a program 408. The physical processor 402 can be a component 104 of FIG. 1, the physical memory space 404 can be a component 104 of FIG. 1, the virtual processor 406 can be a virtual component 116 of FIG. 1, and the program 408 can be an application 114 or part of the operating system 112 of FIG. 1. The physical processor 402 includes a memory manager 410 that manages access to the physical memory space 404. The physical memory space 404 can be various volatile and/or nonvolatile memories, such as RAM, Flash memory, and so forth.

The physical processor 402 assigns a virtual machine memory space 412 to the virtual processor 406, and maintains a second level address translation table 414. The second level address translation table 414 maps addresses in the virtual machine memory space 412 to addresses in the physical memory space 404. Which address of the physical memory space 404 a particular address in the virtual machine memory space 412 maps to at any given time can change, and is controlled by the memory manger 410. The memory manager 410 can change mappings, allowing multiple different virtual processors to share the physical memory space 404 and/or allowing the virtual machine memory space 412 to be larger than the physical memory space 404, using any of a variety of public and/or proprietary techniques.

The virtual processor 406 includes a memory manager 416 that manages access to the virtual machine memory space 412. The virtual processor 406 assigns a program memory space 418 to the program 408, and maintains a first level address translation table 420. The first level address translation table 420 maps addresses in the program memory space 418 to addresses in the virtual machine memory space 412. Which address of the virtual machine memory space 412 a particular address in the program memory space 418 maps to at any given time can change, and is controlled by the memory manger 416. The memory manager 416 can change mappings, allowing multiple different programs to share the virtual machine memory space 412 and/or allowing the program memory space 418 to be larger than the virtual machine memory space 412, using any of a variety of public and/or proprietary techniques.

In response to an access to an address in the program memory space 418, the memory manager 416 uses the first level address translation table 420 to translate the memory address in the program memory space 418 to an address in the virtual machine memory space 412. The access can take various different forms, such as the address of code of the program 408 to be executed by an operating system, the address where data to be read is stored by the program 408, the address where data to be written by the program 408 is to be stored, and so forth.

Similarly, in response to an access to an address in the virtual machine memory space 412, the memory manager 410 uses the second level address translation table 414 to translate the memory address in the virtual machine memory space 412 to an address in the physical memory space 404. The access can take various different forms, such as the address of code of an operating system core (e.g., kernel) managed by the virtual processor 406 to be run, an address of the program 408 to be executed by an operating system, the address where data to be read is stored by the program 408 or an operating system core, the address where data to be written by the program 408 or an operating system core is to be stored, and so forth.

In one or more embodiments, the first level address translation table 420 and the second level address translation table 414 map pages of addresses rather than individual addresses. For example, the first level address translation table 420 maps pages of the program memory space 418 to pages of the virtual machine memory space 412, and the second level address translation table 414 maps pages of the virtual machine memory space 412 to pages of the physical memory space 404. Alternatively, the table 414 and/or the table 420 can map addresses based on other groupings, such as individually or other sub-page collections of addresses, in collections of multiple pages, and so forth.

The virtual processor 406 can run in kernel mode or user mode. The memory manager 416 can maintain a record of memory pages that can be executed in kernel mode. This record can be included as part of the first level address translation table 420 or alternatively maintained in other manners. The memory manager 410 maintains a record of memory pages in the virtual machine memory space 412 that can be executed in kernel mode. This record can be included as part of the second level address translation table 414 or alternatively maintained in other manners.

When an access is made to execute code on the virtual processor 406, the address of the code to be executed is translated by the first level address translation table 420 to obtain a translated address in the virtual machine memory space 412, and the translated address is then translated by the second level address translation table 414 to obtain an address in physical memory space 404. If the access is made while the virtual processor 406 is operating in user mode, then an operating system running on the virtual processor 406 applies the appropriate policy in determining whether the code can be executed.

However, if the access is made while the virtual processor is operating in kernel mode, then a check is made as to whether execute permission for kernel mode has been given to the page. A record of whether execute permission for kernel mode has already been given to the page can optionally be maintained in the second level address translation table 414, or alternatively elsewhere by the physical processor 402. In such situations, if execute permission for kernel mode has already been given to the page, then an indication that execute permission for kernel mode has been given to the page can be returned to the virtual processor 406 and the operating system running on the virtual processor 406 allows the code to execute while the virtual processor 406 is in kernel mode.

If execute permission for kernel mode has not yet been given to the page, then the operating system running on the virtual processor 406 can optionally request that the page be made executable for kernel mode. The virtual processor 406 passes the request to the virtual machine manager (or other higher privileged entity), which performs a code integrity check as discussed above. If the code integrity check succeeds then the page is given execution permission for kernel mode, and if the code integrity check fails then the page is not given execution permission for kernel mode.

In one or more embodiments, an attribute is included in the second level address translation table 414 to allow execution permission for kernel mode to be specified separately from the execution permission or policy for user mode. This attribute can be encoded in the second level address translation table 414 in a variety of different manners, but includes the following three characteristics. First, the attribute is implemented in the second level address translation table so that the attribute can be controlled independently for each second level translation (each translation performed by the memory manager 410 using the second level address translation table 414). Second, the attribute applies to kernel mode execution permission—the attribute need not affect (but alternatively could affect) read and/or write permission in kernel mode (and in user mode). Third, the attribute allows kernel mode execution to be disabled independently from user mode execution, allowing at least the following two combinations of execution: 1) disallow execution in kernel mode but allow execution in user mode; 2) disallow execution in kernel mode and disallow execution in user mode.

The at least one attribute can be included in the second level address translation table 414 in a variety of different manners. For example, each entry in the second level address translation table can include two bits, one bit corresponding to user mode execution and one bit corresponding to kernel mode execution. The bit corresponding to user mode pages can be assigned one value (e.g., assigned a value of "1", also referred to as the bit being set) to indicate that permission to execute code on the page in user mode is given, and assigned another value (e.g., assigned a value of "0", also referred to as the bit being cleared) to indicate that permission to execute code on the page in user mode is not given. Similarly, the bit corresponding to kernel mode execution can be assigned one value (e.g., assigned a value of "1", also referred to as the bit being set) to indicate that permission to execute code on the page in kernel mode is given, and assigned another value (e.g., assigned a value of "0", also referred to as the bit being cleared) to indicate that permission to execute code on the page in kernel mode is not given.

In one or more embodiments, in the second level address translation table 414, the initial or default value for memory pages is to disallow execution (execution permission is not given) for kernel mode but allow execution (execution permission is given) for user mode. If code integrity of code in a memory page has been verified by the virtual machine manager (or other more privileged entity), then the values for the memory page can be changed to allow execution (execution permission is given) for kernel mode for the page as well as for user mode. However, if code integrity of code in a memory page fails a code integrity check by the operating system, the operating system can optionally change (or request that the virtual machine manager change) the values for the memory page to disallow execution (execution permission is not given) for user mode for the page.

It should be noted that the second level address translation table 414 is under control of a virtual machine manager, such as the virtual machine manager 102 of FIG. 1. The second level address translation table 414 is not accessible by software running in the virtual machine (e.g., the applications 114 or the operating system 112 of the virtual machine 106 of FIG. 1). The operating system in the virtual machine has direct control over its first level address translation table, and the virtual machine manager has exclusive control over the second level address translation table. Thus, by having a kernel mode execution control in the second level address translation table, the virtual machine manager can efficiently and easily use this control to grant or deny kernel mode execution access independently of the operating system's management of the first level address translation table. By having the ability to restrict kernel mode code execution in the second level address translation table, the virtual machine manager can enforce its code integrity policies without directly involving itself in the first level address translation table updates performed by the operating system in the virtual machine.

It should also be noted that although first and second level address translation tables are discussed above, alternatively the virtual machine manager enforced code integrity can be implemented in software using a single address translation table (e.g., the first level address translation table). For example, the virtual machine manager can take control of the first level address translation table (e.g., table 420 of FIG. 4) and prevent the operating system from within the virtual machine from directly accessing the first level address translation table. The virtual machine manager can then enforce the policies discussed above (e.g., the virtual machine manager can ensure that code executable by the kernel is code that the virtual machine manager has verified, but the virtual machine manager enforces no restrictions on user mode code execution).

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
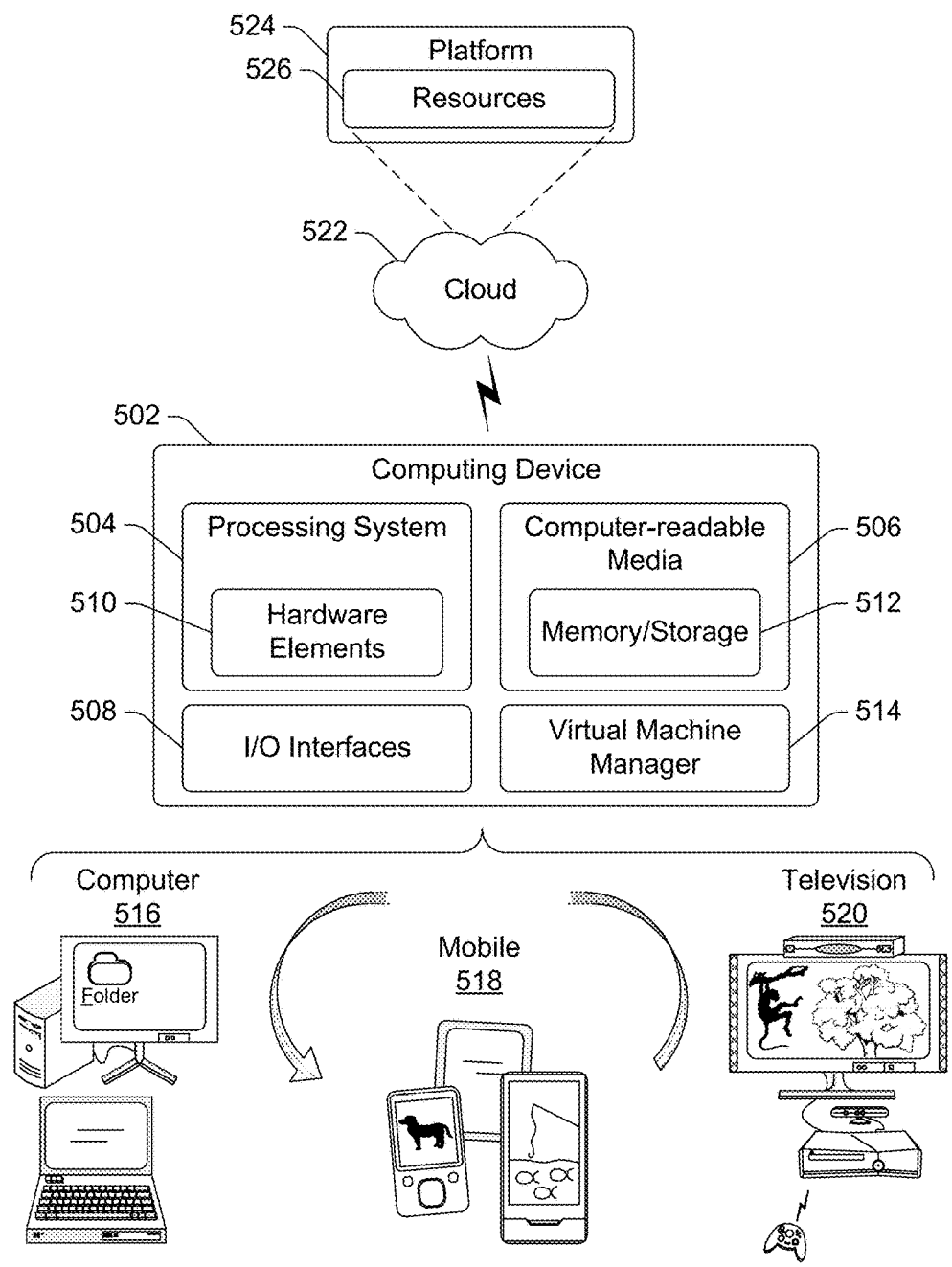
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Computing device 502 also includes a virtual machine manager 514 (also referred to as a hypervisor). Virtual machine manager 514 allows a virtual machine to run on computing device 502. Virtual machine manager 514 can be, for example, virtual machine manager 102 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   identifying, in response to a request by a virtual machine or operating system running in the virtual machine to make a memory page executable, the memory page, the memory page comprising one of a plurality of memory pages storing code for a program including executable code to be executed by a virtual processor of the virtual machine, the virtual machine being managed by a virtual machine manager;
   determining, in response to the request to make the memory page executable, whether the identified memory page of the plurality of memory pages storing code for the program is to be executable in a kernel mode or a user mode;
   performing, by a more privileged entity than the operating system of the virtual machine and in response to determining that the identified memory page of the plurality of memory pages storing code for the program is to be executable in the kernel mode, a code integrity check of the executable code stored in the plurality of memory pages and allowing execution of the executable code only if the code integrity check verifies the executable code stored in the plurality of memory pages; and
   allowing, in response to determining that the identified memory page of the plurality of memory pages storing code for the program is not to be executable in the kernel mode, the operating system of the virtual machine to determine whether to allow execution of the executable code of all of the plurality of memory pages storing code for the program in the user mode.

2. A method as recited in claim 1, the more privileged entity than the operating system of the virtual machine comprising the virtual machine manager, the determining whether the identified memory page is to be executed in kernel mode being performed by the virtual machine manager, and the allowing the operating system of the virtual machine to determine whether to allow execution of the executable code in a user mode being performed by the virtual machine manager.

3. A method as recited in claim 1, further comprising performing, by the operating system and in response to determining that the identified memory page is not to be executable in the kernel mode, the code integrity check of the executable code and allowing execution of the executable code only if the code integrity check by the operating system verifies the executable code.

4. A method as recited in claim 1, the allowing execution of the executable code comprising setting an execution permission attribute of a memory page in which the code is stored, the setting the execution permission attribute comprising setting the execution permission attribute to allow execution of the executable code for kernel mode.

5. A method as recited in claim 1, the performing the code integrity check comprising verifying a chain of trust for the executable code, and using a digital signature to verify that the executable code has not been altered since being digitally signed.

6. A method as recited in claim 1, the virtual processor including a first level address translation table, the computing device further including a physical processor including a second level address translation table, an attribute of the second level address translation table allowing execution permission for kernel mode of the virtual processor to be specified separately from execution permission or policy for user mode of the virtual processor.

7. A method as recited in claim 1, the computing device further comprising a component including an attribute allowing execution permission for kernel mode of the virtual processor to be specified separately from execution permission or policy for user mode of the virtual processor.

8. A method as recited in claim 7, the attribute allowing the execution permission for kernel mode of the virtual processor to be specified separately from execution permission or policy for user mode of the virtual processor on a per memory page basis.

9. A method as recited in claim 7, the attribute applying to kernel mode execution permission, and the attribute affecting neither kernel mode read permission nor kernel mode write permission.

10. A method as recited in claim 7, the attribute allowing one combination of execution that disallows execution of code in the identified memory page by the virtual processor in the kernel mode but allows execution of the code in the identified memory page by the virtual processor in user mode, and an additional combination of execution that disallows execution of the code in the identified memory page by the virtual processor in kernel mode and disallows execution of the code in the identified memory page by the virtual processor in the user mode.

11. A computing device including an operating system, a virtual machine manager, and a processor, the processor being programmed with instructions to:
    determine, in response to a request by a virtual machine to make a memory page of multiple memory pages storing code for a program executable and for each memory page of the multiple memory pages storing code for the program, whether the memory page is to be executable in a kernel mode or a user mode;
    allow, if the memory page is to be executable in the kernel mode, the virtual machine manager to restrict kernel mode execution of all of the multiple memory pages storing code for the program to allow execution of the code only if the integrity of the multiple memory pages storing code for the program have been verified by a higher privileged entity that is more privileged than the operating system; and
    allow, if the memory page is to be executable in the user mode, user mode execution of all of the multiple memory pages storing code for the program without regard for whether integrity of code on the memory pages storing code for the program has been verified by the higher privileged entity.

12. A computing device as recited in claim 11, the operating system being further configured to allow user mode execution of all of the multiple memory pages storing code for the program if the integrity of the multiple memory pages has been verified by the operating system.

13. A computing device as recited in claim 11, the processor being further programmed with instructions to set an execution permission attribute of a memory page storing code the integrity of which has been verified by the virtual machine manager.

14. A computing device as recited in claim 11, the processor including an address translation table an attribute of which allows execution permission for kernel mode execution of memory pages to be specified separately from execution permission for user mode execution of memory pages.

15. A computing device as recited in claim 11, the processor further including a hardware component having an attribute allowing execution permission for kernel mode execution of memory pages to be specified separately from execution policy for user mode execution of memory pages.

16. A computing device as recited in claim 15, the attribute allowing execution permission for kernel mode execution of memory pages to be specified separately from execution policy for user mode execution of memory pages on a per memory page basis.

17. A computing device as recited in claim 15, the attribute applying to kernel mode execution permission for memory pages, and the attribute affecting neither kernel mode read permission nor kernel mode write permission for memory pages.

18. A computing device as recited in claim 15, the attribute allowing one combination of execution that disallows kernel mode execution of code in the memory page but allows user mode execution of the code in the memory page, and an additional combination that disallows both kernel mode execution of the code in the memory page and user mode execution of the code in the memory page.

19. A computer-readable storage medium having stored thereon multiple instructions that, responsive to execution by one or more physical processors of a computing device, cause the one or more physical processors to perform operations comprising:
    identifying, in response to a request by a virtual machine or operating system running in the virtual machine to make a memory page executable, the memory page, the memory page comprising one of a plurality of memory pages storing code for a program including executable code to be executed by a virtual processor of the virtual machine of the computing device, the virtual machine being managed by a virtual machine manager of the computing device;
    determining, in response to the request to make the memory page executable, whether the identified memory page of the plurality of memory pages storing code for the program is to be executable in a kernel mode or a user mode;

in response to determining that the memory page of the plurality of memory pages storing code for the program is to be executable in the kernel mode:

performing, by the virtual machine manager, a code integrity check of the executable code of the identified memory page of the plurality of memory pages storing code for the program, and allowing execution of the executable code of all of the plurality of memory pages storing code for the program for the kernel mode only if the code integrity check verifies the executable code of the identified memory page; and in response to determining that the identified memory page of the plurality of memory pages storing code for the program is not to be executable in the kernel mode, allowing an operating system of the virtual machine to determine whether to allow execution of the executable code of all of the plurality of memory pages storing code for the program in the user mode, the operating system allowing execution of the executable code only if a policy of the operating system is satisfied.

20. The computer-readable storage medium of claim 19, the computing device further comprising a component including an attribute allowing execution permission for kernel mode of the virtual processor to be specified separately from execution permission or policy for user mode of the virtual processor.

* * * * *